United States Patent
Kim et al.

(10) Patent No.: US 8,223,824 B2
(45) Date of Patent: Jul. 17, 2012

(54) CABLE MODEM AND METHOD OF PERFORMING CHANNEL BONDING USING DIGITAL UPCONVERTER

(75) Inventors: Yang Su Kim, Daejeon (KR); Yun Jeong Song, Daejeon (KR); Soo In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 276 days.

(21) Appl. No.: 12/641,810

(22) Filed: Dec. 18, 2009

(65) Prior Publication Data
US 2010/0158086 A1    Jun. 24, 2010

(30) Foreign Application Priority Data
Dec. 19, 2008    (KR) .................... 10-2008-0130232

(51) Int. Cl.
*H04B 1/38*    (2006.01)
*H04L 5/16*    (2006.01)

(52) U.S. Cl. ........ 375/222; 375/219; 375/220; 375/295; 375/257

(58) Field of Classification Search ................... 375/222, 375/219, 220, 316, 295, 257
See application file for complete search history.

(56) References Cited

U.S. PATENT DOCUMENTS
6,215,828 B1 *    4/2001    Signell et al. ................. 375/316
2007/0195817 A1    8/2007    Denney et al.

FOREIGN PATENT DOCUMENTS
KR    1020080052271 A    6/2008
* cited by examiner

*Primary Examiner* — Phuong Phu
(74) *Attorney, Agent, or Firm* — Ladas & Parry LLP

(57) ABSTRACT

A cable modem is provided. The cable modem may include: a plurality of modulators to generate a plurality of pieces of digital data corresponding to a plurality of independent channels; a plurality of digital upconverters to up-convert a frequency of each of the plurality of pieces of digital data into a predetermined frequency; and a Radio Frequency (RF) processor to channel-bond outputs of the plurality of digital upconverters into at least one channel, and generate an analog output signal, the outputs having the predetermined frequency.

10 Claims, 6 Drawing Sheets

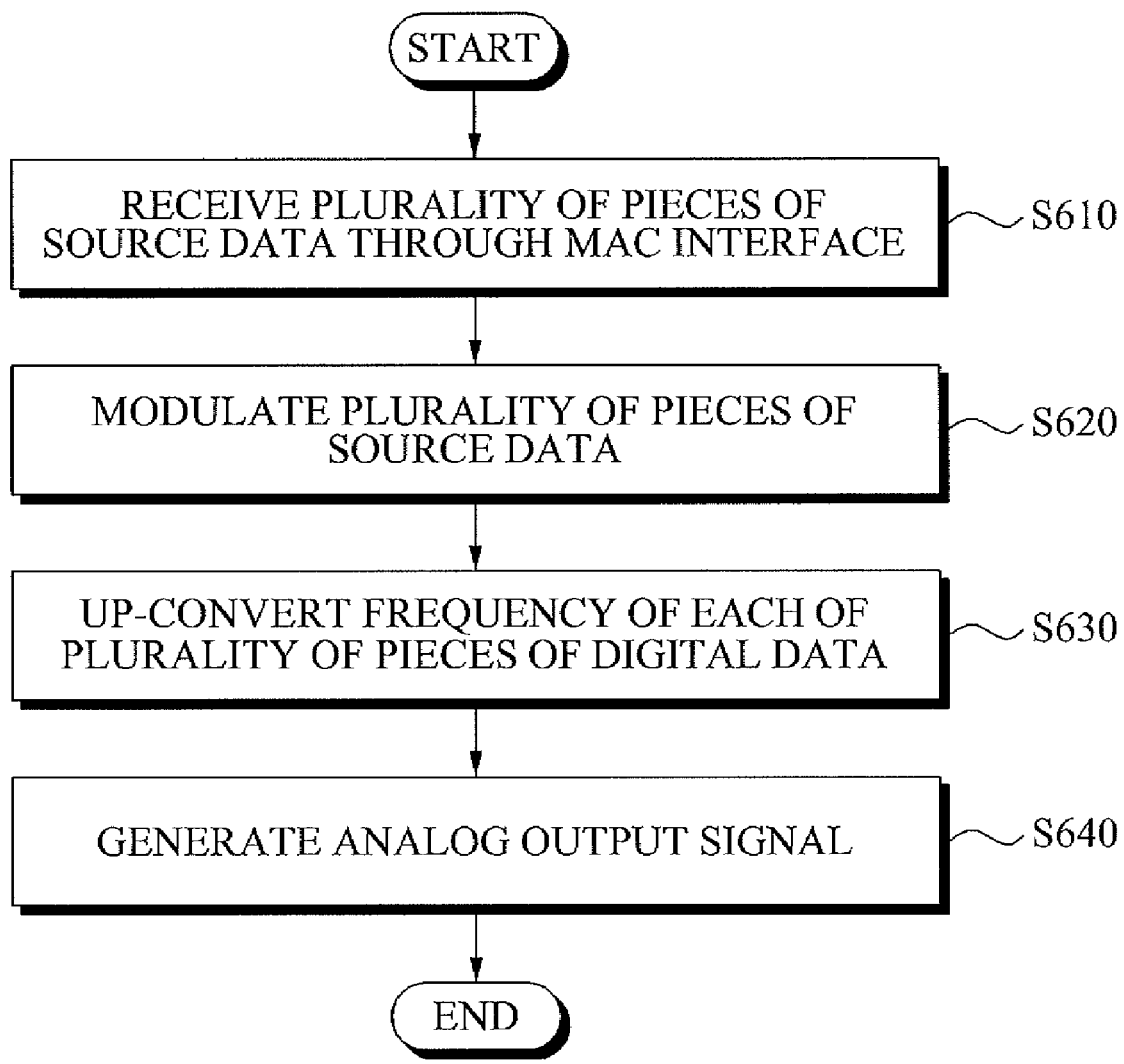

CABLE MODEM AND METHOD OF PERFORMING CHANNEL BONDING USING DIGITAL UPCONVERTER

CROSS-REFERENCE TO RELATED APPLICATION

This application claims priority from Korean Patent Application No. 10-2008-0130232, filed on Dec. 19, 2008, in the Korean Intellectual Property Office, the entire disclosure of which is incorporated herein by reference.

BACKGROUND OF THE INVENTION

1. Field of the Invention

The present invention relates to a cable modem performing channel bonding, and more particularly, to a cable modem transmitting in an upstream in a Hybrid Fiber Coaxial (HFC) network.

2. Description of Related Art

A Data Over Cable Service Interface Specification (DOCSIS) 3.0 has been provided. This standard may support a downlink transmission rate of 150 Mbps and an uplink transmission rate of over 120 Mbps in a Hybrid Fiber Coaxial (HFC) network.

A channel bonding technology is used to increase an uplink transmission speed up to over 120 Mbps. That is, a channel bonding technology may enable a plurality of independent channels to be channel-bonded to a single channel, and enable a cable modem to achieve a higher transmission speed using the bonded channel.

A general cable modem may transmit upstream by modulating source data, converting digital data to an analog signal, and generating an output signal with a radio frequency using the converted analog signal. Also, a general cable modem may require a plurality of analog-frequency converters to generate an output signal with a radio frequency using a converted analog signal.

However, a plurality of analog-frequency converters may cause the increase in complexity of a cable modem. Also, an error generated when the plurality of analog-frequency converters converts a frequency may not be significantly reduced.

SUMMARY OF THE INVENTION

The present invention provides a cable modem which includes a digital upconverter up-converting a frequency of digital data in a previous stage of a Radio Frequency (RF) processor, and thereby may reduce a complexity of the RF processor.

The present invention also provides a cable modem which up-converts a frequency of digital data using a digital upconverter, and thereby may reduce an error generated when an RF processor converts a frequency.

According to an aspect of the present invention, there is provided a cable modem, including: a plurality of modulators to generate a plurality of pieces of digital data corresponding to a plurality of independent channels; a plurality of digital upconverters to up-convert a frequency of each of the plurality of pieces of digital data into a predetermined frequency; and a Radio Frequency (RF) processor to channel-bond outputs of the plurality of digital upconverters into at least one channel, and generate an analog output signal, the outputs having the predetermined frequency.

The plurality of digital upconverters may up-convert the frequency of each of the plurality of pieces of digital data before the RF processor generates the analog output signal, and thus a configuration of the RF processor may be simple and an error generated when a frequency is converted may be reduced.

In an aspect of the present invention, the RF processor may include: a plurality of amplifiers to amplify the outputs of the plurality of digital upconverters; a plurality of band-pass filters to perform band-pass filtering with respect to outputs of the plurality of amplifiers; and a combiner to combine outputs of the plurality of band-pass filters into the at least one channel. Also, the cable modem may further include: a low band-pass filter to perform low band-pass filtering with respect to an output of the combiner; and an amplifier to amplify an output of the low band-pass filter.

According to an aspect of the present invention, there is provided an upstream transmission method, including: receiving a plurality of pieces of source data through a Medium Access Control (MAC) interface; modulating the plurality of pieces of source data and generating a plurality of pieces of digital data corresponding to a plurality of independent channels; up-converting a frequency of each of the plurality of pieces of digital data into a predetermined frequency and generating first outputs; and channel-bonding the first outputs with the predetermined frequency into at least one channel and generating an analog output signal.

According to the present invention, a cable modem may include a digital upconverter up-converting a frequency of digital data in a previous stage of an RF processor, and thereby may reduce a complexity of the RF processor.

Also, according to the present invention, a cable modem may up-convert a frequency of digital data using a digital upconverter, and thereby may reduce an error generated when an RF processor converts a frequency.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which:

FIG. 6 is a flowchart illustrating an upstream transmission method according to an embodiment of the present invention.

DETAILED DESCRIPTION OF EXEMPLARY EMBODIMENTS

Figure 1:
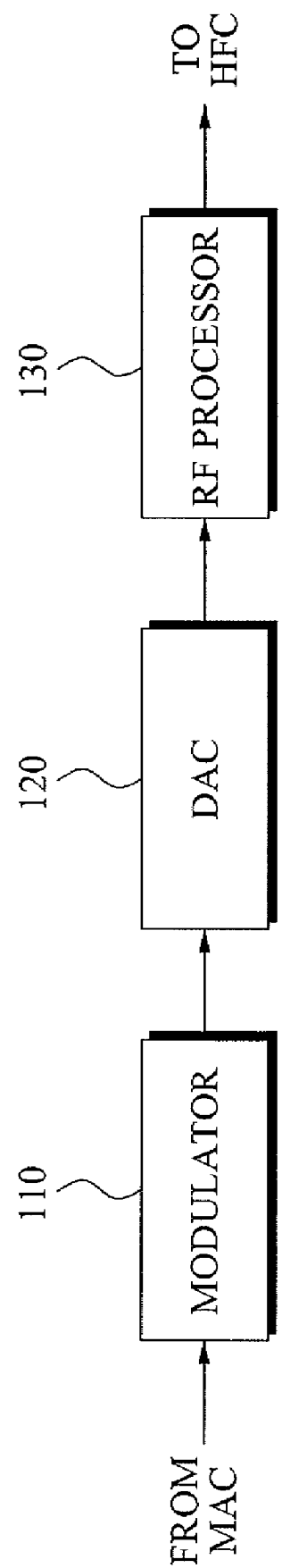
FIG. 1 is a diagram illustrating a cable modem using a single channel in a conventional art.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

FIG. 1 is a diagram illustrating a general cable modem using a single channel.

Referring to FIG. 1, the cable modem using a single channel may include a modulator 110, a Digital-to-Analog Converter (DAC) 120, and a Radio Frequency (RF) processor 130.

The modulator 110 may modulate source data according to a predetermined modulation scheme and generate digital data. Also, the generated digital data may be provided to the DAC 120.

The DAC 120 may convert the digital data into an analog output signal. Also, the RF processor 130 may up-convert a frequency of the analog output signal into an RF range, generate a final output signal, and transmit the generated final output signal to a receiver through a Hybrid Fiber Coaxial (HFC) network.

In this instance, it may be ascertained that the RF processor 130 up-converts the frequency of the analog output signal into the RF range. Accordingly, it may be ascertained that the RF processor 130 requires a frequency modulator.

Figure 2:
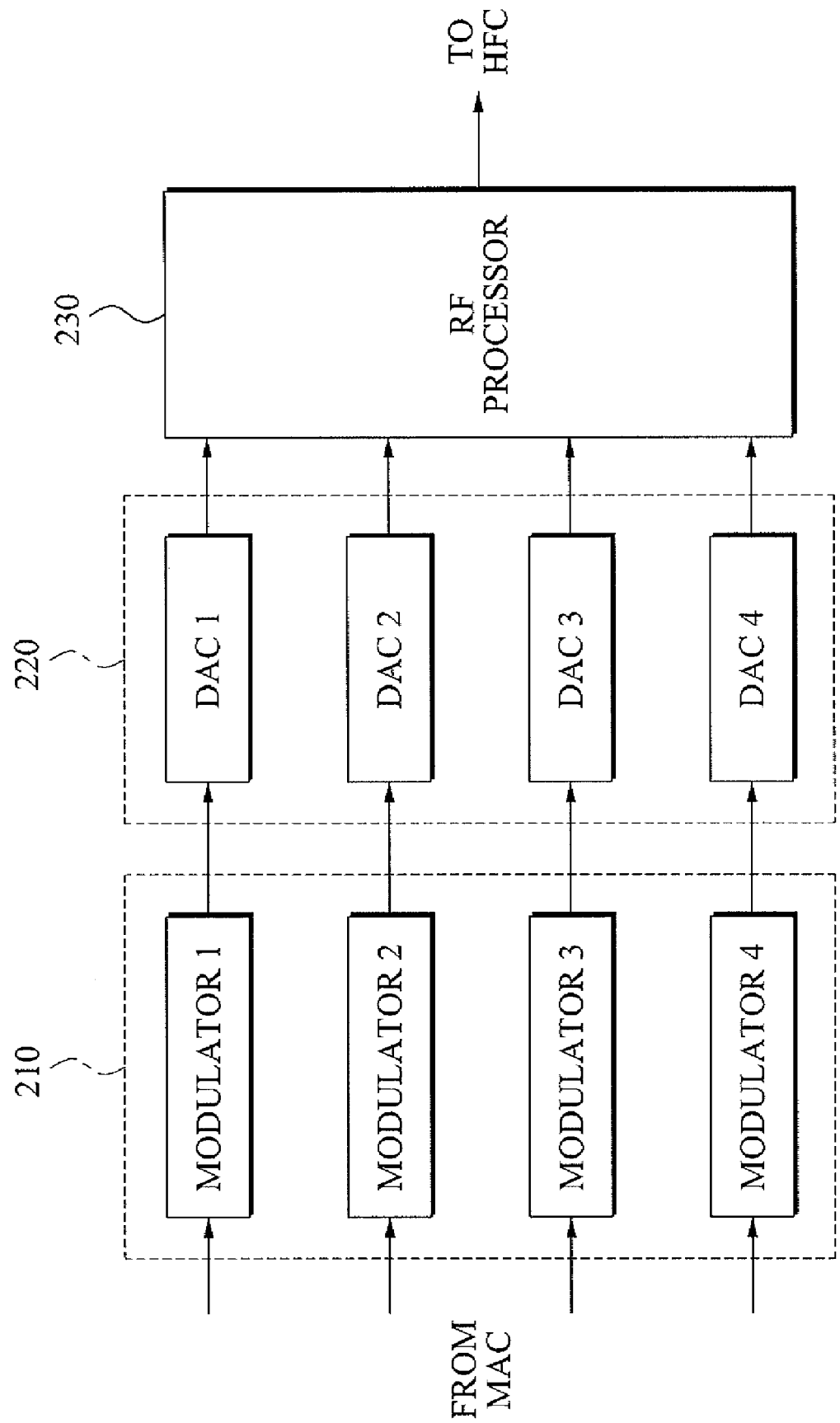
FIG. 2 is a diagram illustrating a cable modem using a multi-channel in a conventional art.

FIG. 2 is a diagram illustrating a general cable modem using a multi-channel.

Referring to FIG. 2, a cable modem based on a Data Over Cable Service Interface Specification (DOCSIS) 3.0 standard may include a plurality of modulators 210, a plurality of DACs 220, and an RF processor 230.

The plurality of modulators 210 may modulate source data corresponding to a plurality of independent channels. Outputs of the plurality of modulators 210 may be provided to the plurality of DACs 220.

The plurality of DACs 220 may convert the outputs of the plurality of modulators 210 into analog signals.

The RF processor 230 may up-convert a frequency of each of the converted analog signals into an RF, and channel-bond the analog signals into a single channel.

In this instance, when the cable modem uses a channel-bonding technology, it may be ascertained that the RF processor 230 requires a plurality of frequency modulators to up-convert the frequency of each of the analog signals. The plurality of frequency modulators may cause a complex configuration of the RF processor 230. Also, an error, generated when the RF processor 230 up-converts the frequency of each of the analog signals into the RF, is required to be reduced.

Figure 3:
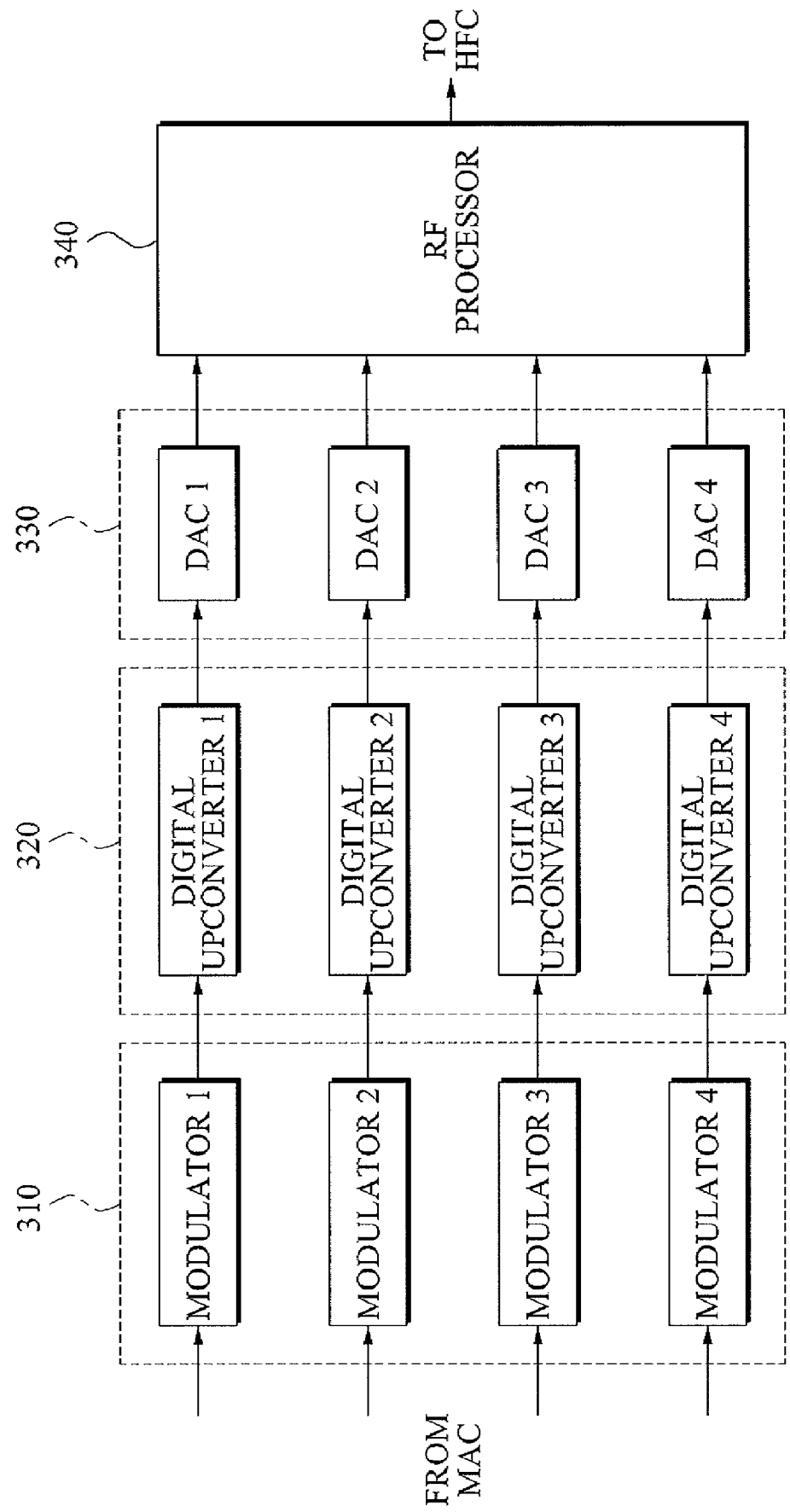
FIG. 3 is a diagram illustrating a cable modem using a multi-channel according to an embodiment of the present invention.

FIG. 3 is a diagram illustrating a cable modem using a multi-channel according to an embodiment of the present invention.

Referring to FIG. 3, the cable modem using the multi-channel may include a plurality of modulators 310, a plurality of digital upconverters 320, a plurality of DACs 330, and an RF processor 340.

The plurality of modulators 310 may modulate a plurality of pieces of source data corresponding to a plurality of independent channels, and generate a plurality of pieces of digital data.

Each of the plurality of digital upconverters 320 may be connected to each of the plurality of corresponding modulators 310. The plurality of digital upconverters 320 may up-convert a frequency of each of the plurality of pieces of digital data into a predetermined frequency. In particular, the plurality of digital upconverters 320 may up-convert the frequency of each of the plurality of pieces of digital data in advance to prevent the RF processor 340 from separately performing a frequency upconversion.

Outputs of the plurality of digital upconverters 320 may be provided to the plurality of DACs 330. In this instance, the plurality of DACs 330 may convert the outputs of the plurality of digital upconverters 320 into analog signals.

Also, the RF processor 340 may channel-bond the converted analog signals into at least one channel, and transmit a final output signal to a receiver through an HFC network.

Figure 4:
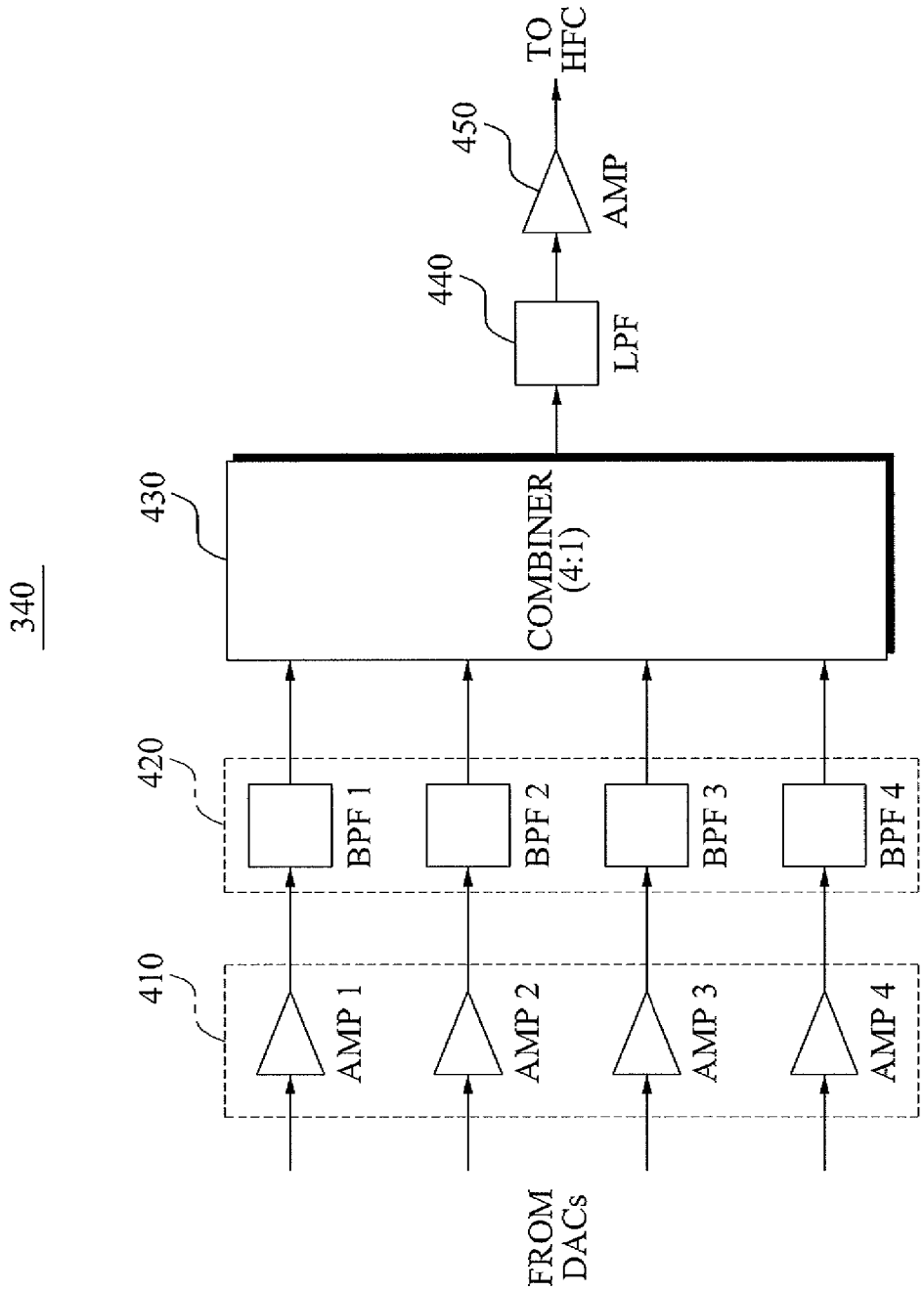
FIG. 4 is a diagram illustrating a Radio Frequency (RF) processor of FIG. 3.

FIG. 4 is a diagram illustrating an RF processor 340 of FIG. 3.

Referring to FIG. 4, the RF processor 340 may include a plurality of amplifiers 410, a plurality of band-pass filters (BPFs) 420, a combiner 430, a low band-pass filter (LPF) 440, and an amplifier 450.

The plurality of amplifiers 410 may amplify outputs of the plurality of DACs 330 of FIG. 3. Also, outputs of the plurality of amplifiers 410 may pass the plurality of band-pass filters 420, and thus undesired components existing in other bands may be removed.

Outputs of the plurality of band-pass filters 420 may be provided to the combiner 430. The combiner 430 may combine the outputs of the plurality of band-pass filters 420 into a single channel.

An output of the combiner 430 may pass the low band-pass filter 440, be amplified through the amplifier 450, and be transmitted to a receiver through an HFC network.

Figure 5:
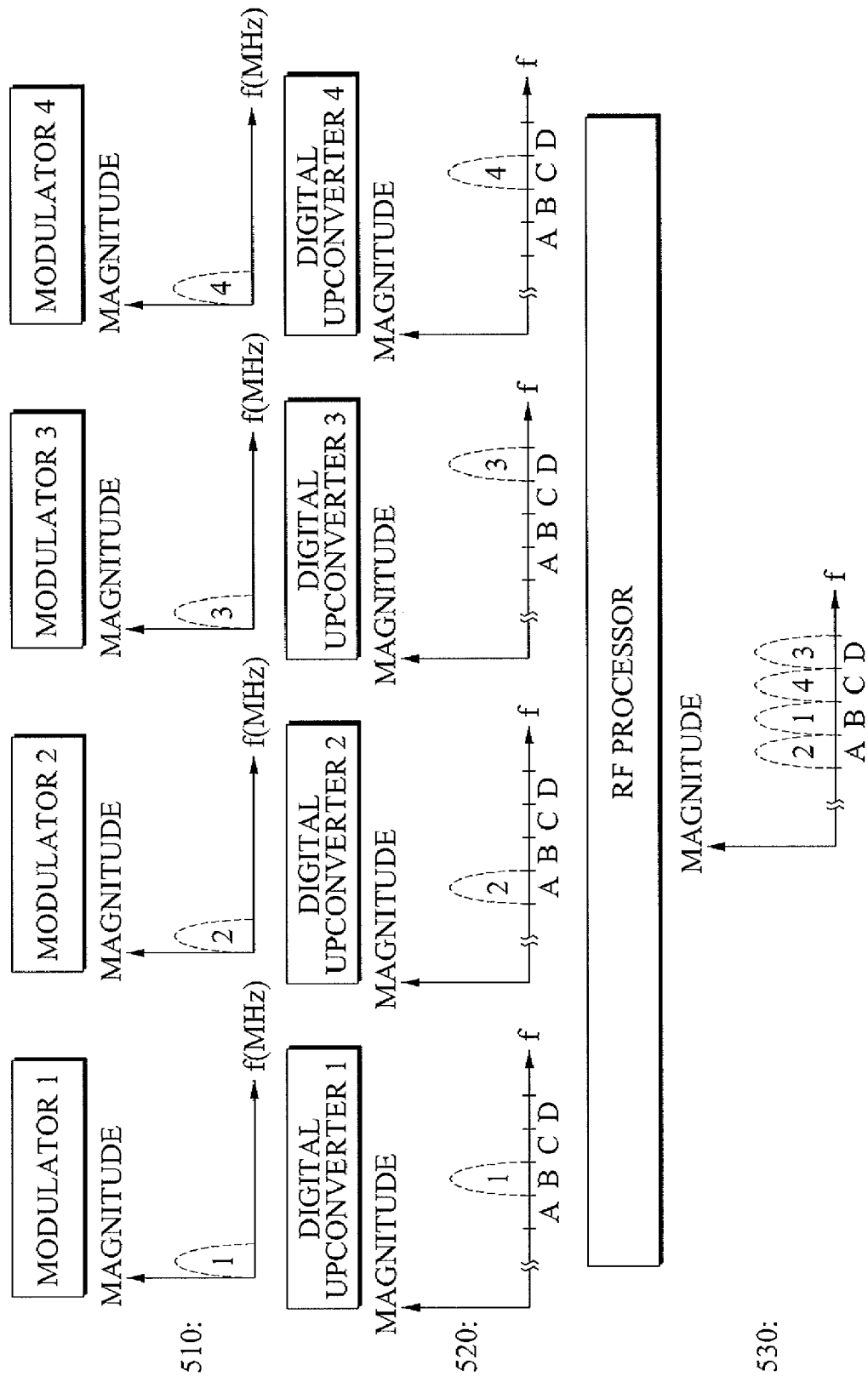
FIG. 5 is a diagram illustrating an example of outputs of each of modules of FIG. 3.

FIG. 5 is a diagram illustrating an example of outputs of each of modules of FIG. 3.

Referring to FIG. 5, four graphs 510 may indicate outputs of modulators. '1', '2', '3', and '4' illustrated in each of the four graphs 510 may indicate an output of each of a modulator 1, a modulator 2, a modulator 3, and a modulator 4.

Four graphs 520 may indicate outputs of digital upconverters. A digital upconverter 1 may up-convert a frequency of the output of the modulator 1 into a band B. A digital upconverter 2 may up-convert a frequency of the output of the modulator 2 into a band A, and a digital upconverter 3 may up-convert a frequency of the output of the modulator 3 into a band D. Also, a digital upconverter 4 may up-convert a frequency of the output of the modulator 4 into a band C.

In this instance, the outputs of the digital upconverters may be provided to an RF processor. The RF processor may channel-bond the outputs, existing in the bands A, B, C, and D, of the digital upconverters. That is, the RF processor may consider the bands A, B, C, and D as a single frequency band, and thereby may generate a final output signal.

Accordingly, the RF processor is not required to perform a separate frequency upconversion.

FIG. 6 is a flowchart illustrating an upstream transmission method according to an embodiment of the present invention.

Referring to FIG. 6, in operation S610, a cable modem may receive a plurality of pieces of source data through a Medium Access Control (MAC) interface.

In operation S620, the cable modem may modulate the plurality of pieces of source data, and generate a plurality of pieces of digital data corresponding to a plurality of independent channels.

In operation S630, the cable modem may up-convert a frequency of each of the plurality of pieces of digital data into a predetermined frequency, and generate first outputs.

In operation S640, the cable modem may channel-bond the first outputs with the predetermined frequency into at least one channel, and generate an analog output signal.

Further detailed descriptions will be omitted herein, since the descriptions described with reference to FIGS. 1 and 5 may be applied to the upstream transmission method described with reference to FIG. 6.

The upstream transmission method according to the above-described example embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A cable modem, comprising:
a plurality of modulators that generate a plurality of pieces of digital data corresponding to a plurality of independent channels;
a plurality of digital upconverters, wherein each of the plurality of digital upconverters:
receives a respective piece of digital data of the plurality of pieces of digital data corresponding to each independent channel of the plurality of independent channels, and
up-converts a frequency of each of the received plurality of pieces of digital data into a predetermined frequency;
a plurality of digital-to-analog (D/A) converters, wherein each of the plurality of D/A converters receives a respective up-converted piece of digital data from a respective digital upconverter; and
a Radio Frequency (RF) processor that channel-bonds outputs of the plurality of D/A converters into at least one channel.

2. The cable modem of claim 1, wherein the plurality of digital upconverters up-converts the frequency of each of the plurality of pieces of digital data before the RF processor generates the analog output signal.

3. The cable modem of claim 1, wherein the predetermined frequency is identical to a frequency of the analog output signal.

4. The cable modem of claim 1, wherein the RF processor comprises:

a plurality of amplifiers to amplify the outputs of the plurality of digital upconverters;
a plurality of band-pass filters to perform band-pass filtering with respect to outputs of the plurality of amplifiers; and
a combiner to combine outputs of the plurality of band-pass filters into the at least one channel.

5. The cable modem of claim 4, further comprising:
a low band-pass filter to perform low band-pass filtering with respect to an output of the combiner; and
an amplifier to amplify an output of the low band-pass filter.

6. The cable modem of claim 1, wherein each of the plurality of modulators corresponds to each of the plurality of digital upconverters, and a number of modulators is at least four.

7. The cable modem of claim 1, wherein the plurality of independent channels is a plurality of upstream channels.

8. The cable modem of claim 1, wherein the analog output signal is transmitted through a Hybrid Fiber Coaxial (HFC) network.

9. An upstream transmission method, comprising:
receiving a plurality of pieces of source data through a Medium Access Control (MAC) interface;
modulating the plurality of pieces of source data and generating a plurality of pieces of digital data corresponding to a plurality of independent channels;
up-converting a frequency of each of the plurality of pieces of digital data into a predetermined frequency and generating first outputs;
converting respective first outputs to respective analog signals of a plurality of analog signals; and
channel-bonding the plurality of analog signals into at least one channel,
wherein the generating of the first outputs up-converts the frequency of each of the plurality of pieces of digital data into the predetermined frequency and generates the first outputs before the analog output signal is generated.

10. A cable modem comprising:
a plurality of independent channels that receive respective source data, wherein each channel includes a respective modulator, a respective digital upconverter, and a respective digital-to-analog (D/A) converter for modulating and upconverting the received respective source data and converting the modulated and upconverted respective source data into respective analog signals; and
a radio frequency (RF) processor that receives the respective analog signals and channel-bonds the analog signals into at least one channel.

* * * * *